United States Patent
Ray

(10) Patent No.: US 9,430,688 B1
(45) Date of Patent: Aug. 30, 2016

(54) OVERLAPPING MULTI-SIGNAL CLASSIFICATION

(71) Applicant: The Boeing Company, Chicago, IL (US)

(72) Inventor: Gary A. Ray, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/668,952

(22) Filed: Mar. 25, 2015

(51) Int. Cl.
*G06K 7/10* (2006.01)

(52) U.S. Cl.
CPC .................................. *G06K 7/10851* (2013.01)

(58) Field of Classification Search
CPC .. G06K 7/14; G06K 2209/01; G06K 7/1443; G06K 7/1456; G06K 7/1465; G06K 7/1486; G06K 9/00577; G06K 9/2063; G06K 9/6203; G06K 7/10851; G06T 1/0071; G06T 2201/0051; G06T 2201/0064; G06T 2201/0083
USPC ............. 235/462.01–462.45, 472.01–472.03, 235/375

See application file for complete search history.

(56) References Cited

U.S. PATENT DOCUMENTS

| | | | | |
|---|---|---|---|---|
| 5,696,805 A * | 12/1997 | Gaborski | ............... | G01N 23/04 378/54 |
| 6,131,013 A * | 10/2000 | Bergstrom | ............. | H04B 1/123 455/501 |
| 6,513,714 B1 * | 2/2003 | Davis | ................... | G06K 7/1486 235/462.01 |
| 2008/0130963 A1 * | 6/2008 | Sakaue | .................... | G07D 7/20 382/125 |
| 2008/0316510 A1 * | 12/2008 | Sakaue | ............. | H04N 1/32101 358/1.9 |
| 2009/0190183 A1 * | 7/2009 | Hosoda | ................. | G06T 1/0071 358/3.28 |
| 2013/0321674 A1 * | 12/2013 | Cote | ........................ | H04N 9/64 348/242 |
| 2014/0071251 A1 * | 3/2014 | Nakamura | ............ | G06F 3/0346 348/51 |

OTHER PUBLICATIONS

Carlsson, Topology and Data, Bulletin of the AMS, Apr. 2009, pp. 255-307.
Carlsson, et al., Persistent Clustering and a Theorem of J. Kleinberg ,arXiv preprint arXiv:0808.2241 (2008).
Zomorodian, et al., Computing persistent homology, Discrete and Computational Geometry, 33 (2), pp. 247-274; 2004.
Carlsson, et al., Persistence barcodes for shapes. International Journal of Shape Modeling 11.02 (2005): 149-187.
Ghrist, "Barcodes: the persistent topology of data." Bulletin of the American Mathematical Society 45.1 (2008): 61-75.
Edelsbrunner, et al. "Topological persistence and simplification." Discrete and Computational Geometry 28.4 (2002): 511-533.
Carlsson, et al., "An algebraic topological method for feature identification." International Journal of Computational Geometry & Applications 16.04 (2006): 291-314.
Carlsson, "Persistent homology and the analysis of high dimensional data." Symposium on the Geometry of Very Large Data Sets, Feb. 2005.

* cited by examiner

*Primary Examiner* — Thien M Le
(74) *Attorney, Agent, or Firm* — MH2 Technology Law Group, LLP

(57) ABSTRACT

A system and method for multi-signal classification that classifies a signal or a variable utilizing topological data analysis (TDA) specifically, via the theory of persistent homology; and encode the persistent homology of a data set in the form of a parameterized version of a Betti number by way of a topology data function which is more generally referred to as a persistence diagram or barcode.

20 Claims, 11 Drawing Sheets

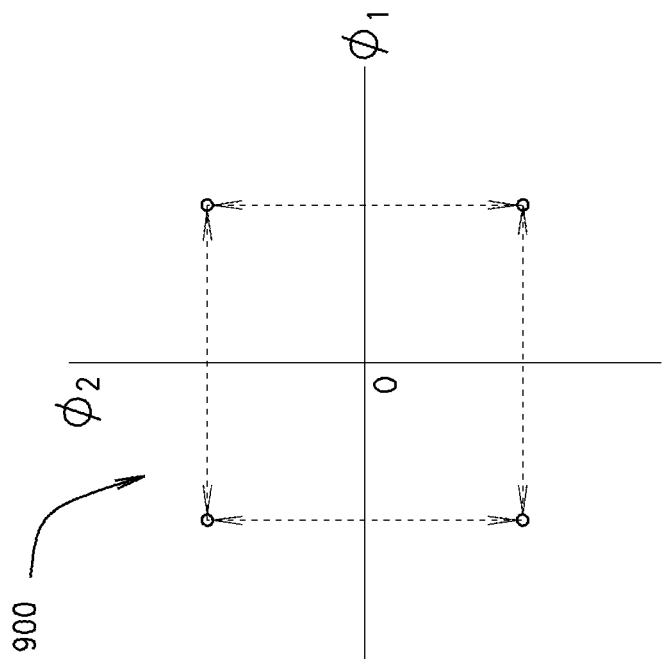
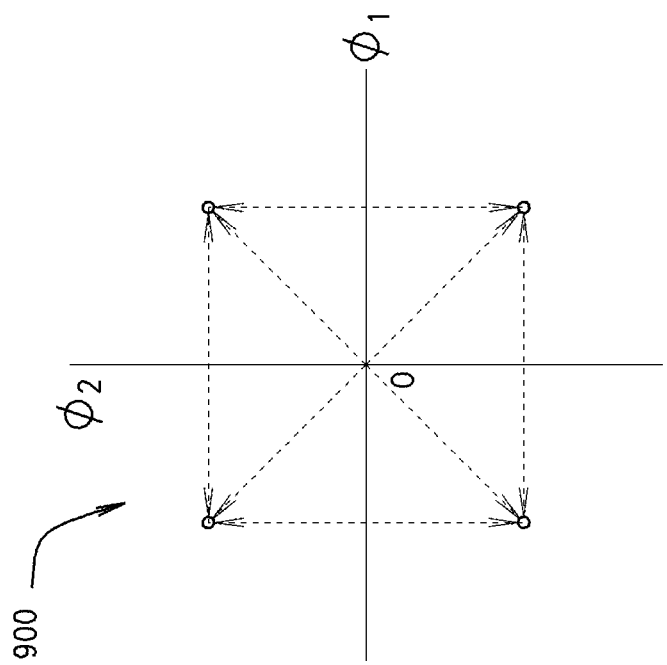

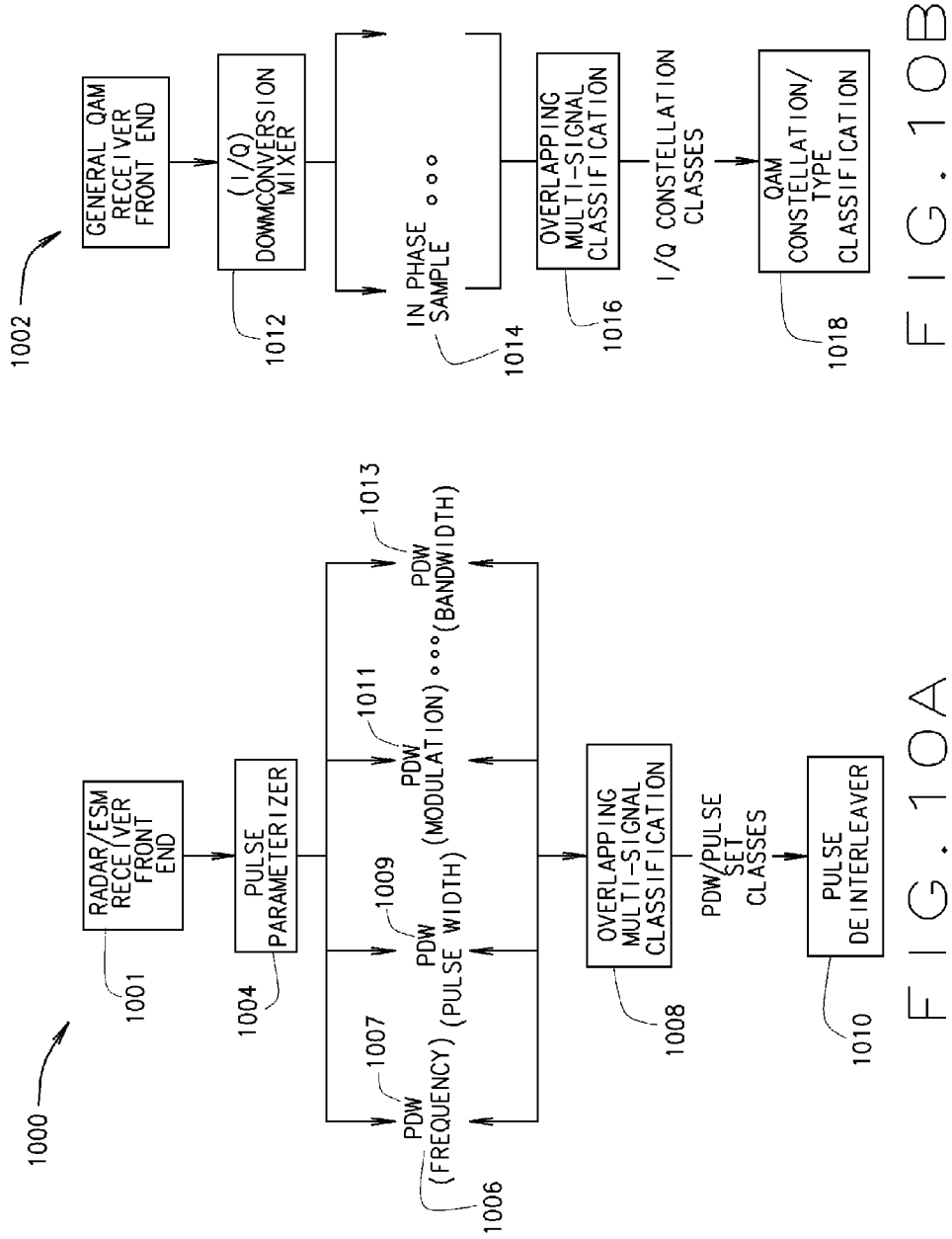

OVERLAPPING MULTI-SIGNAL CLASSIFICATION

BACKGROUND

1. Field

This technology as disclosed herein relates generally to signal classification and, more particularly, to classifying signals with overlapping classifications.

2. Background

Signal classification is a fundamental problem within the technical area of signal processing. A common signal classification problem is detecting the constellation and modulation type of a communications signal. Other more signal-class specific problems include detecting the number and type of radar signals present in a signal, detecting the number and type of sonar signals present, or classifying speech signals based on speaker or language. Some methods have been utilized to address classification problems. Many methods are specific to the type of signal under study and would not work for more general types of signals. Also many methods are limited to very specific cases or applications. A system and method is needed that works for various types of signals and with a varying number of dimensions with a varying number of parameters.

SUMMARY

The technology as disclosed herein and its various implementations is a system and method that provides signal classification regardless of the type of signal, and gives the ability to separate signals via histograms based on one or more parameters that the user chooses. The technology as disclosed is also effective in the presence of noise and scaling.

The system and method as disclosed uses a modification technique to the shape classification method and system, which is generally described herein as a persistent barcode tailored to signal classification using histograms. The technology as disclosed solves the general problem of classifying signals with overlapping classifications. The technology as disclosed utilizes a particular set of chosen parameters in a histogram setting.

Using histograms as a general method to classify signals by trying to separate the signals using a method that chooses the "best" histogram peak and then de-accumulating the histogram before finding the next "best" peak has been attempted in the past, but has significant drawbacks. Selecting the "best" histogram peak and determining how "best" is defined can vary from one method to another when looking to previous technologies, but one skilled in the art will understand that these methods can have significant drawbacks. By way of illustration, one drawback can be that de-accumulating will only filter a certain portion of the detections, leaving most or many detections still in the histogram. This can cause distortion in the next iteration when the next peak is discovered, leading to growing misclassification. Another problem that is basic to such "best" peak methods is, namely, how the "best" peak is defined. This "best" peak methodology can lead to simple peak measures that cannot be distinguished among interspersed peaks that are clearly different in size and shape.

The technology as disclosed herein and its various implementations can overcome drawbacks with previous classification methods which rely on histograms, and the technology as disclosed herein is particularly more effective under ambiguous signal conditions which have overlapping classifications. The present technology as disclosed is able to overcome previous drawbacks in existing classification methods which rely on histograms, especially under ambiguous conditions with overlapping classification conditions. The technology also has the flexibility to allow for trade-offs in sensitivity to histogram shape. The technology has utility, industrial applicability and many benefits that relate directly to signal processing applications such as radar, electronic warfare and communications. Other areas of specific utility for the present technology as disclosed include: detecting the constellation and modulation type of a communications signal, detecting the number and type of radar signals present in a signal, detecting the number and type of sonar signals present, and classifying speech signals based on speaker or language.

One implementation of the present technology as disclosed can include a histogram generator having N dimensional vector signal data or parameter data input adapted to receive one or more of a signal and/or a variable. The histogram generator can be configured to form an original N dimensional histogram function from one or more of N dimensional signal parameter data for the signal and/or N dimensional variable parameter data for the variable. The N dimensional histogram function is formed for extracting characteristic parameters of one or more of the variable and/or the signal. The technology can further include a smoothing filter having a histogram input adapted to receive the original N dimensional histogram function. The technology can further adapted to filter one or more original N dimensional histogram function bins by treating one or more of histogram bin heights as an N-dimensional signal and thereby creating a smooth shaped curve outline for the N dimensional histogram function to reduce barcode fracturing. A processor can be configured to compute and output a collection of barcode tracks.

The barcode tracks can be created by an intersection of the N dimensional histogram function and a topological data analysis function (such as a parametrized level set) thereby generating the collection of barcode tracks. The barcode tracks can be tracked down from higher levels of the N dimensional histogram function through a lower level where the collection of barcode tracks disappear whereby there is no further segmented regions (intervals in 1 dimension, areas in 2 dimensions, volumes in 3 dimensions, etc.) to thereby produce a set of disjointed regions that represent the possible locations of classes, at least one for at least one region bounded by the barcode tracks. The processor can further be configured to perform a function of joining one or more short barcode tracks (whose length is below a certain $\Delta_{min}$ value chosen as a function of the signal to noise ratio as applied to each of the signal parameters and that persists for a time period shorter than a certain $\Delta_t$ value chosen as a function of the signal to noise ratio as applied to at least one of the signal parameters) to a longest barcode track that is nearest to the short barcode track under consideration. A final collection of barcode tracks is thereby produced and further configured to classify the one or more of the signal and the variable received based on the final collection of barcode tracks and output a signal classification.

Another implementation of the technology is a process of generating, using a computing process, a histogram generator forming an original N dimensional histogram function from one or more of N dimensional signal or parameter data for a signal and/or N dimensional variable parameter data. Forming of the N dimensional histogram function is for a variable for extracting characteristic parameters of one or more of the variable and/or the signal. The process can further include filtering, using a computing process, the original N dimensional histogram function with a smoothing filter to filter one or more original N dimensional histogram function bins by treating one or more of histogram bin heights as an N-dimensional signal and thereby creating a smooth shaped curve outline N dimensional histogram function to reduce barcode fracturing. The process can include computing with a computer processor and outputting a collection of barcode tracks created by an intersection of the N dimensional histogram function and a topological data analysis function.

The process can thereby include generating the collection of barcode tracks that is tracked down from a higher level of the N dimensional histogram function through a lower level where the collection of barcode tracks disappear. Therefore, there are no further segmented regions to thereby produce a set of disjointed regions that represent the possible locations of classes, at least one for at least one region bounded by the barcode tracks. The technology can also include computing a function of joining one or more short barcode tracks (whose length is below a certain $\Delta_{min}$ value chosen as a function of the signal to noise ratio as applied to at least one of the signal parameters and that persists for a time period shorter than a certain $\Delta_t$ value chosen as a function of the signal to noise ratio as applied to each of the signal parameters) to a longest barcode track that is next to the short barcode track under consideration. The technology can thereby perform the process of producing a final collection of barcode tracks and further classifying the one or more of the signal and its parameters received based on the final collection of barcode tracks and outputting a signal classification.

The present technology as disclosed and/or claimed herein provides for classification of groups of arbitrary signals under user-chosen parameter sets even under overlapping classification conditions.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIGS. 9A and 9B are diagrammatic representations of QPSK and OQPSK modulation constellations, respectively;

FIG. 10A is a diagrammatic representation of an application of the technology as disclosed with radar;

FIG. 10B is a diagrammatic representation of an application of the technology as disclosed with a communication signal; and, FIG. 11 is a diagrammatic representation of a classifier system.

Figure 1:
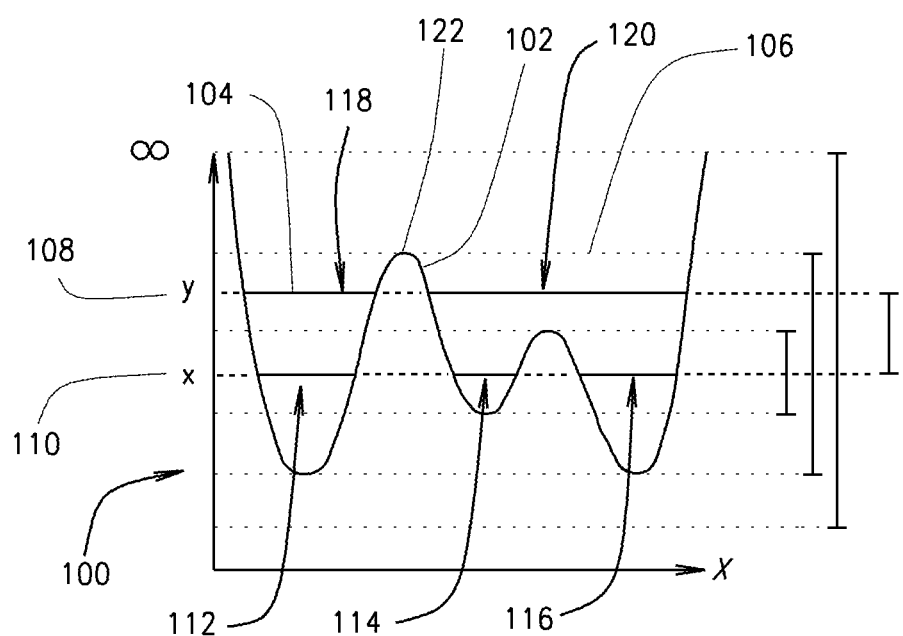
FIG. 1 is a diagrammatic representation of a barcode and barcode tracking using levels to create barcodes.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIG. 1-11 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified.

One implementation of the present technology as disclosed comprising a persistent barcode system and method teaches a novel apparatus and method for classifying overlapping signals.

The present technology as disclosed uses a topology technique, which is useful for multi-dimensional shapes under continuous transformation. When utilizing the disclosed histogram-based overlapping classifier, the input includes binned points (vectors) in N-dimensional space. The present technology as disclosed creates an N-dimensional surface with peaks at various points which can be characterized in order to determine what types of signals are present. When utilizing the topology techniques with real data, the technology also addresses problems of noise and sampling. By way of illustration, when sampling points from X with noise $\{X_k+n_k\}$, generally the shape information of X cannot be inferred from $\{X_k+n_k\}$ because interpolating to fill in the sampling and data gaps using a fixed threshold can create problems. The present technology as disclosed captures shape information for various possible threshold values concurrently. The technology utilizes a topological data analysis to operate on a function where the collection of the individual regions of the topological data analysis function represents a shape class persisting for its regions. In one dimension, these regions are intervals or segments and will be referred to as such in the remainder of the description. However, this technique also applies more generally to N dimensions. The collection of segments can be generally referred to as a "barcode" due to its general resemblance to a barcode. Long intervals can correspond to large scale geometric features like wide peaks that provide signal classification while short intervals can correspond to noise or inadequate sampling.

FIG. 1 is an illustration of a one-dimensional version of a flat line signal (barcode) operating on a function of one variable. Each bar represents how long a particular feature, namely the number of distinct segments above the function, are present. For example, the smallest bar 114 represents the interval during which three separate segments are above the function while the longest bar 120 represents the interval during which at least one segment is above the function. This illustrates the concept of persistence in this one-dimensional example.

A histogram can be a graphical representation of the distribution of data. It can be an estimate of the probability distribution of a continuous variable (quantitative variable) or continuous signal. To construct a histogram, the system can "bin" the range of values—that is, divide the entire range of values into a series of small intervals—and then count how many values fall into each interval or "bin." Rectangular intervals can be formed with height proportional to the count and width equal to the bin size, so that adjacent rectangles can abut each other. A histogram may also be normalized to display relative frequencies. It then shows the proportion of cases that fall into each of several categories, with the sum of the heights equaling 1. The bins can be specified as consecutive, non-overlapping intervals of a variable or signal. The bins (intervals) can be adjacent and equal in size. The rectangles of a histogram are drawn so that they touch each other to indicate that the original variable is continuous.

Histograms can provide a rough sense of the density of the data. Also, for density estimation, histograms can be useful for estimating the probability density function of the underlying variable or signal. A histogram can be thought of as a simplistic kernel density estimation, which uses a kernel to smooth frequencies over the bins. This yields a smoother probability density function, which will in general more accurately reflect distribution of the underlying variable. The density estimate could be graphically represented as an alternative to the histogram, and is usually drawn as a curve rather than a set of boxes as shown in FIG. 1.

Figure 2:
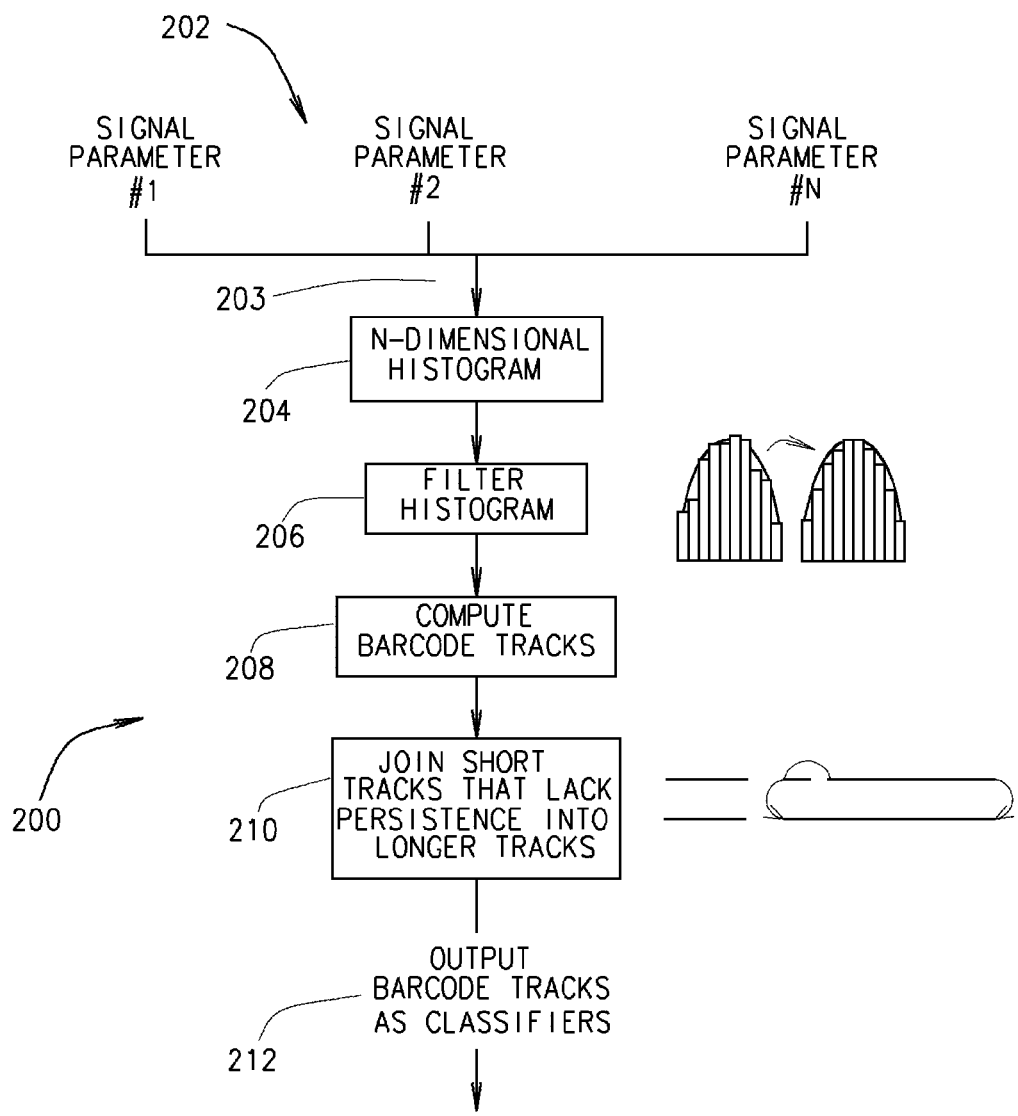
FIG. 2 is a diagrammatic representation of a topological histogram-based signal classification process.

When using a standard classification algorithm, after a histogram function has been constructed from a variable or a signal, the "peaks" are found. The "peaks" can be referred to as events and the event finding method can be accomplished using the following algorithm. Let $\{h_i\}$ be the set of histogram bin values. Compute its mean $\mu 1 = E(h_i > 0)$ above 0 and its mean above mean, $\mu_2 = E(h_i \geq \mu_1)$. All peaks above this value are events. Event finding first finds the highest such peak and given the bin value of this peak, extracts the original pulse data which made up this peak and deaccumulates the histogram. This histogram/event/filter operation is then iterated to find all the peaks or events within the histogram. The standard classification algorithm will result in the problems outlined above. The present technology as disclosed differs from the standard classification algorithm. FIG. 2 shows a block diagram of the present technology as disclosed and the overlapping classification method using tracked barcodes applied to N dimensional histograms, with side illustrations for the one dimensional case.

The present technology as disclosed can include forming an N dimensional histogram from N dimensional signal parameter data. By way of illustration, a 2 dimensional time-frequency histogram of a radar signal can be formed. The technology can further include filtering the original histogram bins by treating the histogram bin heights as an N-dimensional signal and filtering their heights using a smoothing filter thereby creating a more smooth shaped curve outline to reduce barcode (the persistent topology of data) fracturing, as shown in FIG. 2. The smoothing filter is an approximation function or more generally a transformation function that is utilized to smooth a data set. The smoothing filter is an approximating function that captures important patterns in the data, while leaving out noise or other fine-scale structures/rapid phenomena. In smoothing, the data points of an original histogram are modified so individual points are reduced, and points that are lower than the adjacent points are increased, which leads to a smoother signal. Smoothing can aid in data analysis by allowing for more information to be extracted from the data and can provide for analyses that is more flexible. Various smoothing filters can be utilized that are well known in the art.

The method can further include computing the barcode tracks, which are the collection of intervals or segments by way of a persistent topology analysis that is tracked down from higher barcode levels until they disappear, where there are no further tracks (segmenting). This produces a single barcode having a set of disjointed intervals that represent the possible locations of classes, one for each region bounded by the barcode intervals (areas in 2 dimensions, volumes in 3 dimensions, etc.). These are the collection of N dimensional_intervals_or regions (typically one would use simple shapes called n-parallelotopes that generalize intervals in one dimension) that are tracked down from higher barcode levels until they disappear. This produces a single barcode track having a set of disjointed n-parallelotope regions that represent the possible locations of classes, one for each region. Thus, the various classes identified and predicted to be bounded by the union of the disjointed barcode track regions; this would be a union of areas in 2 dimensions, a union of volumes in 3 dimensions, etc. This process is shown pictorially in one dimension in FIG. 1 and described in detail in FIG. 4. This process in described in further detail in FIG. 3.

Topological data analysis (TDA) is a new area of signal analysis. This signal analysis method is used to infer high-dimensional structure from low-dimensional representations, and to assemble discrete points into global structure. The human brain can easily extract global structure from representations in a strictly lower dimension, i.e. we infer a 3D environment from a 2D image from each eye. The inference of global structure also occurs when converting discrete data into continuous images, e.g. dot-matrix printers and televisions communicate images via arrays of discrete points. The main method used by topological data analysis is to replace a set of data points with a family of simplicial complexes, indexed by a proximity parameter; analyze these topological complexes via algebraic topology—specifically, via the theory of persistent homology; and encode the persistent homology of a data set in the form of a parameterized version of a Betti number by way of a topology data function which is more generally referred to as a persistence diagram or barcode.

Figure 3:
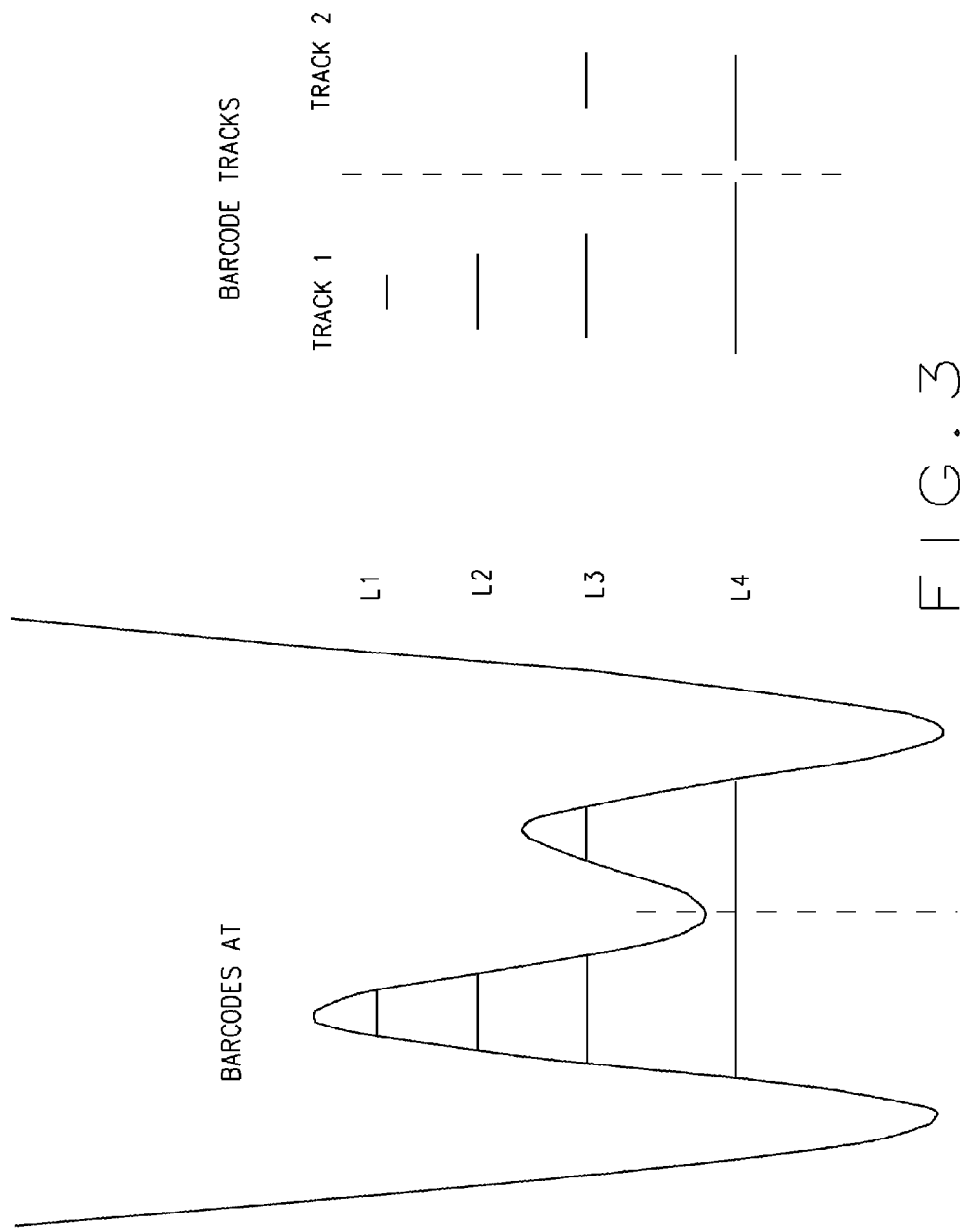
FIG. 3 is a diagrammatic representation of barcode levels and corresponding barcode tracks.

The technology can further include the function of joining short barcode track intervals (i.e. those whose length is below a certain $\Delta_{min}$ value chosen as a function of the signal to noise ratio as applied to each of the signal parameters and that persists for a time period shorter than a certain $\Delta_t$ value chosen as a function of the signal to noise ratio as applied to each of the signal parameters) to the longest barcode track interval that is next to the interval under consideration. The joining process simply takes the smallest interval that encompasses both the short interval and the longest barcode interval next to it. This is illustrated in FIG. 2. FIG. 3 shows the details of the third step above, namely the computation of barcode tracks.

After the basic barcode is computed for the N dimensional histogram, the barcode track process can include (note this is specifically for 1-dimensional barcodes to make the description easier to understand), selecting a barcode level, selecting a barcode interval within this level and if this interval doesn't overlap any of the existing barcode track intervals, then creating a new barcode track interval. If this interval overlaps with one existing barcode track interval, then extend the track on one end to include the new interval. If this interval overlaps two or more existing barcode track intervals, then create a new track whose ends encompass all or at least one of the intersected tracks as well as the interval under consideration.

Figure 6:
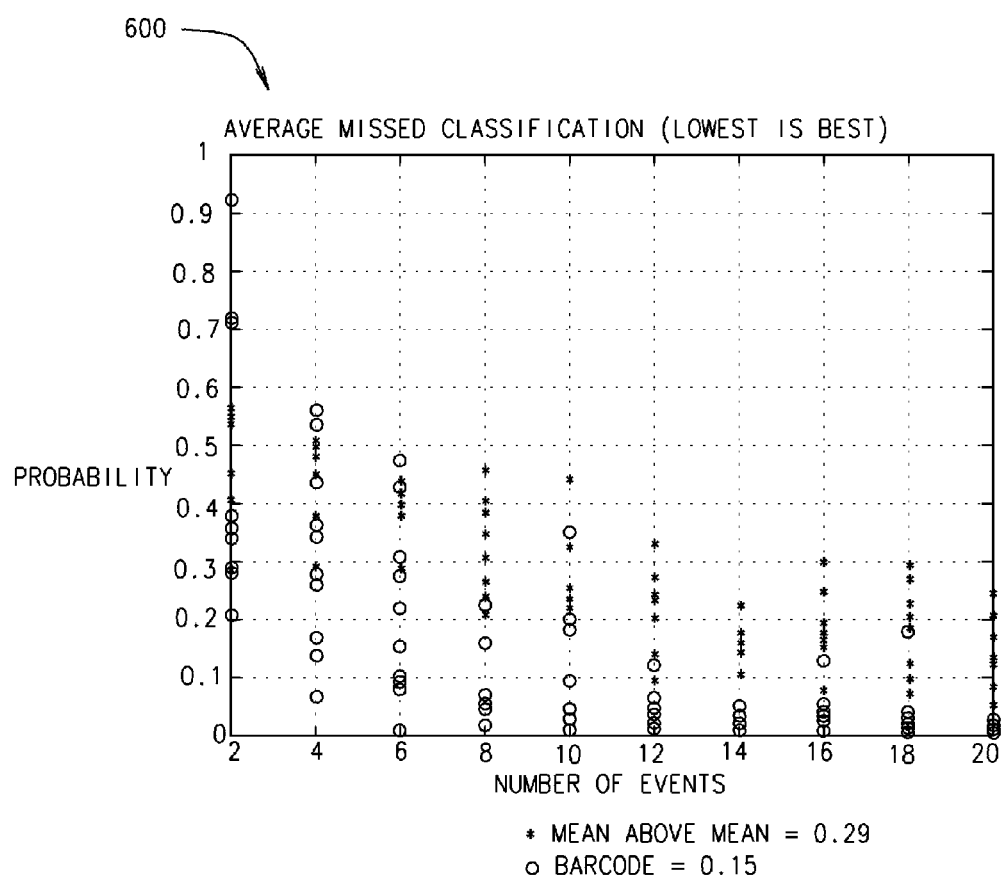
FIG. 6 is a diagrammatic representation of performance improvement of a topological classifier compared to a standard classifier.

By way of illustration of the present technology's utility and industrial applicability, wideband radar receivers will often see many radars operating at the same time, in addition to noise and other interfering signals. If the receiver computes Fourier transforms of its received signal over time, pulses at different frequencies will occur. If these pulses are counted in their frequency bins, what develops is a radar pulse histogram over frequency. Since radars are often agile in frequency, lumps will develop around the center frequency of each radar transmitter received. The signal classification task is then to separate out and classify all the RADAR signals received. This can more generally be applied to other parameters in addition to frequency. For pulsed signals, pulse width can be measured and can also be used to separate signals. Other parameters are modulation type and rate, pulse repetition rate, etc. FIG. 6 shows the results of the classifier of the present technology as disclosed compared to the traditional iterated mean above mean classifier. The results show that the misclassification probability is ½ of the traditional classifier, representing a 50% improvement in the misclassification rate, which provides a significant system level improvement.

By way of further illustration of the utility of the present technology as disclosed, when an unknown digital communications signal is received, its basic modulation type is often desired. This classification is often done by a human operator observing an eye diagram. In the case of a quadrature amplitude modulation (QAM) signal, the constellation points are clearly visible when there is no noise and the channel is fully equalized. However, in a typical scenario what occurs is a signal can be received with no equalization applied and would look like FIG. 7. After running a proper equalization algorithm, the individual constellation points start to distinguish themselves as in FIG. 8.

By computing a 2D histogram using in-phase and quadrature as the x and y axis, a histogram based on this figure can be used with the persistent barcode approach of the present technology as disclosed to identify the 16 constellation points (in this specific example), which could then be used to inform the receiver for further processing. Another example is distinguishing between different modulation types within a single constellation. For example, QPSK and offset QPSK (OQPSK) use the same four points in I/Q space but the transition paths are different. QPSK allows any transition between any pair of points, while OQPSK only allows transitions to neighboring points.

The state spaces of these two appear as shown in FIG. 9. Clearly QPSK creates four "eyes" or in topological terms, a square with four holes, while OQPSK simply creates a single loop with one hole. A histogram based on these transition paths could then be used together with the present technology as disclosed to identify the existence of these cross paths. FIG. 10 shows how this technology fits into both the radar and communications examples previously mentioned.

For example, a Radar/ESM application would feed radar receiver output into a pulse parameterizer to produce pulse descriptor words (PDWs) and accumulate an N dimensional histogram from N of the PDW parameters. For example, if three parameters were chosen, such as frequency, pulse width and bandwidth, then a three dimensional histogram would be accumulated based on these three continuous parameters and events would be recognized based on pulses that fell within small ranges around the pulse center frequency, average pulse width and average pulse bandwidth, all of which are typically constant for a period of time when coming from a single radar. Thus, the histogram would appear as a surface of 3D lumps corresponding to each type of pulsed radar signal present and barcode tracks would consist of a set of three dimensional parallelotopes corresponding to a classification of the pulsed radar classes present in the radar signal. Similarly, a communications receiver might receive various types of quadrature amplitude modulation (QAM) communications signals which need to be classified. After down-conversion to produce an I/Q digital signal representing an equalized IF signal reception as talked about previously, the overlapping multi-signal classification using barcode tracks would produce a number of classes corresponding to the points in the constellation of the QAM. The count and location of these points (one point per barcode track region) would provide a classification of the type of QAM being received.

The details of the technology as disclosed and various implementations can be better understood by referring to the figures of the drawing. Referring to FIG. 1, for ease of illustration a one dimensional version of a barcode and how the barcode would operate on a function of one variable at one particular stage is illustrated. An graphical illustration 100 of a one dimensional barcode 104 operating on a smoothed histogram 102 representative of accumulated data from a signal or a variable. One or more parameters are accumulated and represented in a bin of a histogram. The signal or variable is captured or sensed and parameters from the signal are measured and put into a histogram. The parameters accumulate over time. Histogram levels 106 are illustrated by dashed lines. The barcode will descend from a higher level and initially engage the smoothed histogram 102 at its highest peak 122 at which point the barcode scan line is divided into two intervals (barcode tracks) 118 and 120 as illustrated at level "y" 108. As the barcode scan line continues to descend to level "x" 110, then the barcode is segmented into three intervals, 112, 114 and 116 when the barcode scan line descends to engage the second peak. The three intervals 112, 114 and 116 are illustrated at the lower level "x".

Referring to FIG. 2, an illustration of the technology as disclosed including a method for classifying overlapping multi-signals 200 is provided. A plurality of N signal parameters 202 provided from a signal sensing device is received 203. The method includes the process of an N-dimensional histogram being generated 204 by an N-dimensional histogram generator, which can be implemented in software executing on a custom programmed computer or by hardware, such an N-dimensional histogram generation circuit. The histogram generator can produce a histogram of accumulated parameters. The histogram of accumulated parameters can be filtered 206 to smooth the histogram. The process will also include computing barcode tracks 208 and joining 210 the short tracks with the longer tracks. The method can then output barcode tracks as classifiers 212. An N-dimensional histogram is formed from N-dimensional signal parameter data.

Referring to FIG. 3, an illustration of bar code levels and corresponding bar code tracks is provided.

Figure 4:
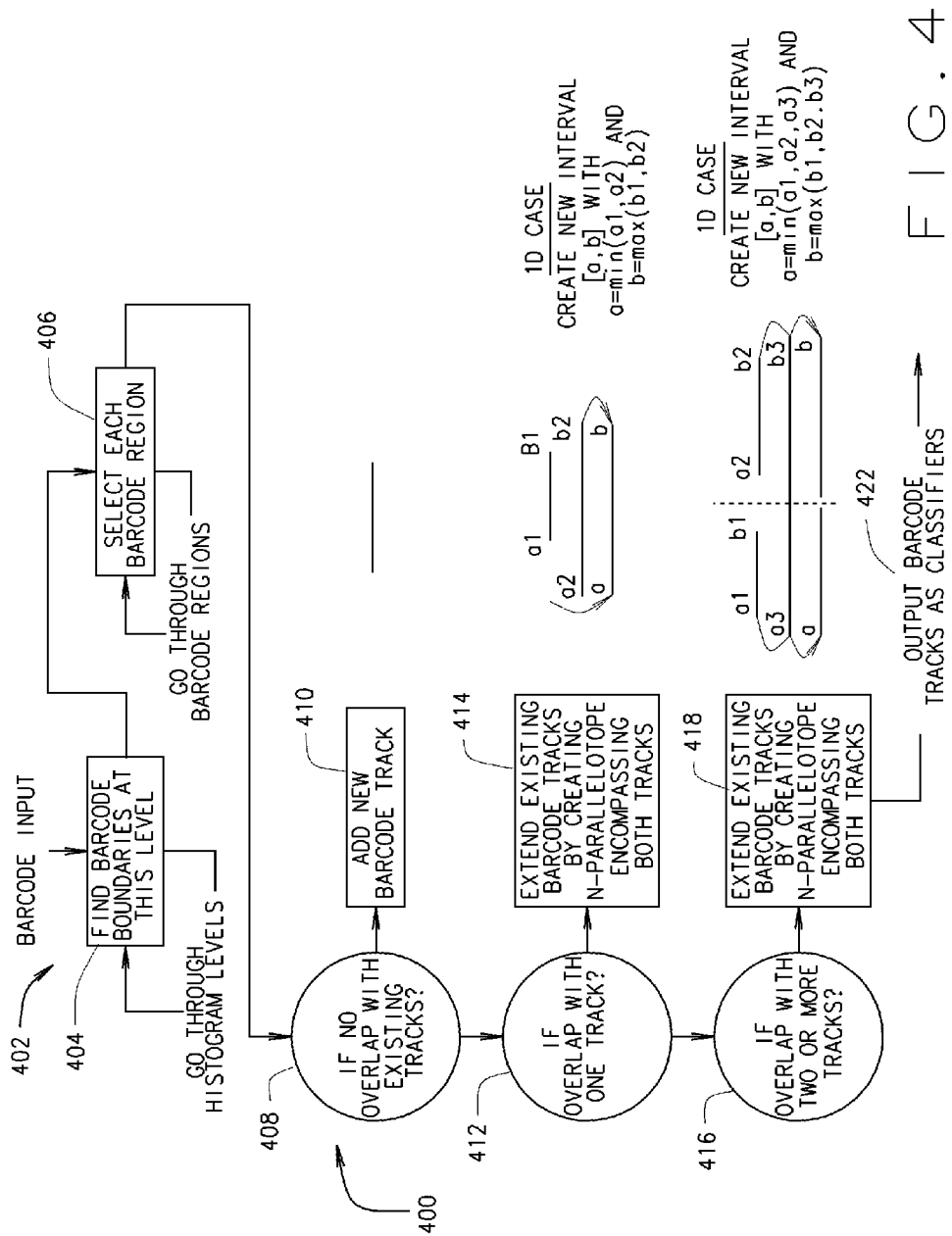
FIG. 4 is a diagrammatic representation of the barcode tracking and joining process in the topological histogram based signal classification.
Figure 5:
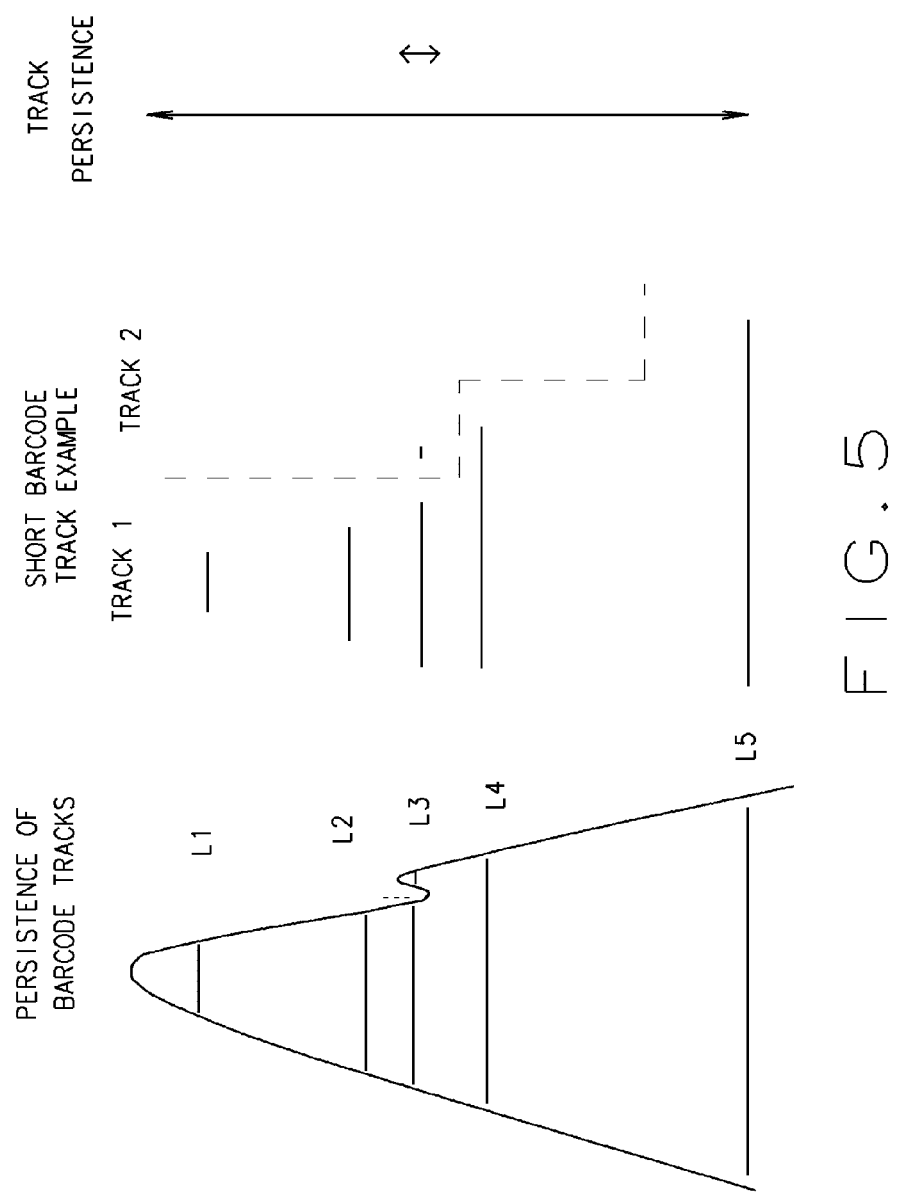
FIG. 5 is a diagrammatic representation of short tracks that lack persistence.

Referring to FIG. 4, an illustration of a method of computing barcode track classifiers 400 is provided. A collection of barcode tracks can be received 402. After the basic barcode is computed for the N dimensional histogram, the barcode track process can include selecting a barcode level and finding the barcode endpoints (or boundaries) for this level 404 and repeating so as to go through all the histogram levels. The method can further include selecting a barcode interval (or region) 406 within each level and going through all levels. If this interval doesn't overlap 408 with any of the existing barcode track intervals, then create a new barcode track interval 410. If this interval overlaps with one existing barcode track interval 412, then extend the track on one end 414 to include the new interval. If this interval overlaps with two or more existing barcode track intervals 416, then create a new track whose ends encompass all the intersected tracks as well as the interval under consideration 418. After joining the short tracks to the longer tracks 420 the barcode track classifiers can be output 422.

One embodiment of the technology can include joining short barcode track intervals that lack persistence to longer barcode intervals. Short or small barcode track intervals (i.e. those whose vectorized length is below a certain min $\Delta_{min}$ (SNR) vector value chosen as a function of the signal to noise ratio (SNR) as applied to each of the signal parameters in each dimension) that persist for a small time interval (less than a certain $\Delta_t$(SNR) chosen as a function of the SNR ratio as well) are joined to a larger barcode track region that is nearest to the interval under consideration. The joining process in one dimension simply takes the smallest interval that encompasses both the short interval and the longer barcode interval next to it. This is shown pictorially in FIG. 2 and in more detail in FIG. 5. In general for N dimensions, a new larger n-parallelotope would be created which encompasses both the smaller barcode track region and the larger barcode track region nearest to it by extending the sides of the new n parallelotope, just as in the one dimensional case where a new interval is created that covers both the small and larger interval.

Referring to FIG. 6, an illustration 600 of the results from the present technology classifier as disclosed as compared to the results from a traditional iterated mean above mean classifier is provided. The results show that the misclassification probability is about approximately ½ of that of the traditional classifier, thereby representing about approximately a 50% improvement in the misclassification rate.

Figure 7:
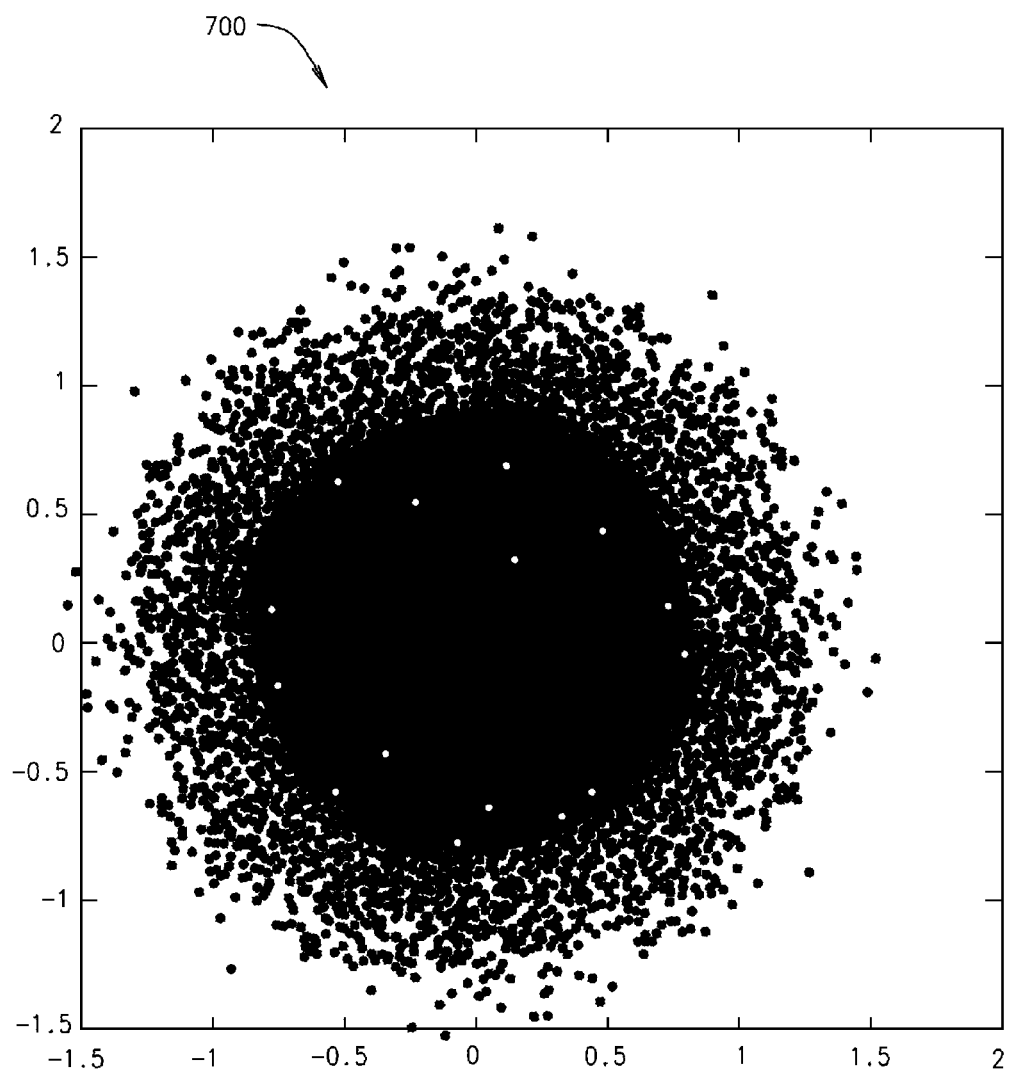
FIG. 7 is a diagrammatic representation of the modulation constellation of an unequalized QAM signal.
Figure 8:
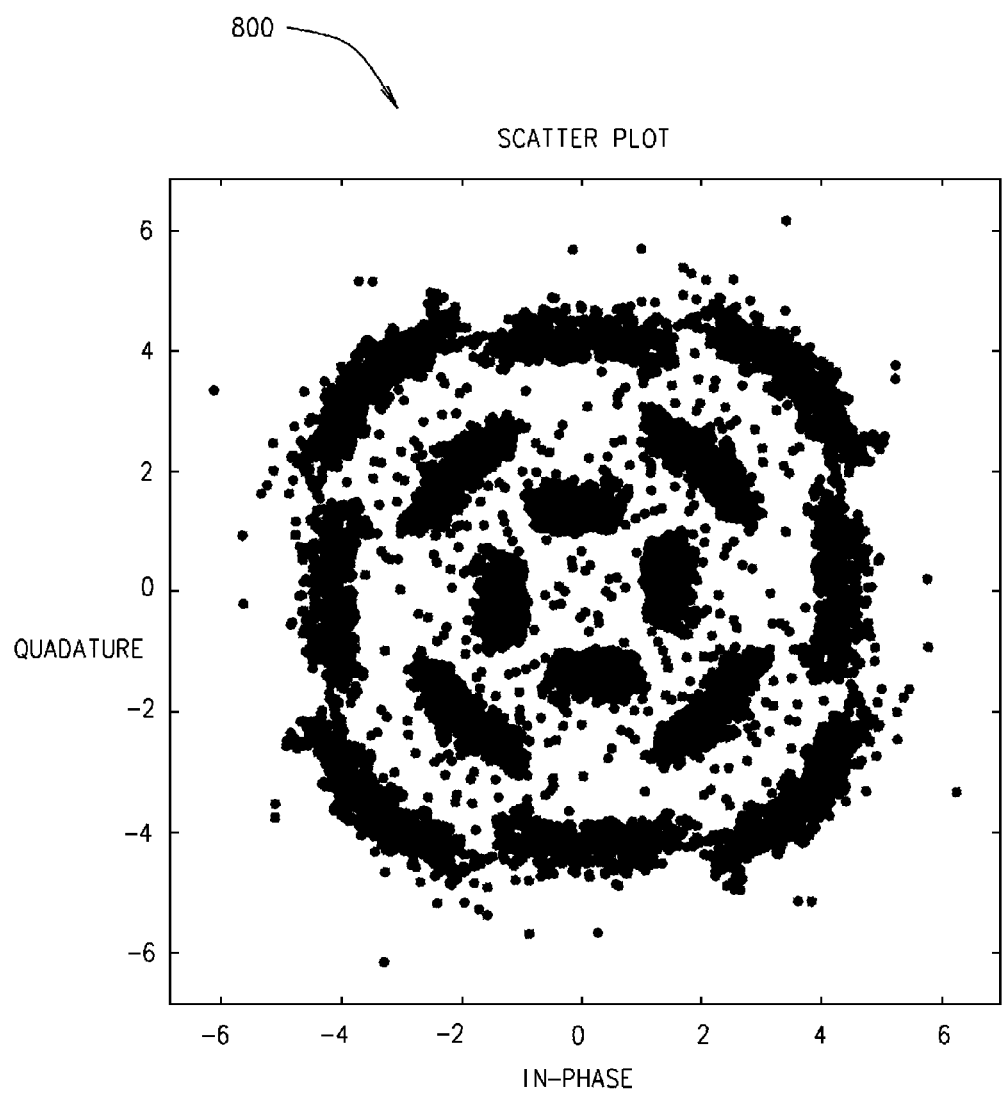
FIG. 8 is a diagrammatic representation of the modulation constellation of an equalized QAM signal.

Referring to FIG. 7, an illustration 700 of an unknown digital communication received with no equalization applied is provided. After running a proper equalization algorithm, the individual constellation points start to distinguish themselves as seen in FIG. 8.

Referring to FIG. 9A and FIG. 9B, an illustration of distinguishing between different modulation types within a single constellation. For example, QPSK and offset QPSK (OQPSK) use the same four points in I/Q space but the transition paths are different. QPSK allows any transition between any pair of points, while OQPSK only allows transitions to neighboring points.

Referring to FIG. 10A, an illustration of a radar system combined with the present technology 1000 is provided. If the receiver 1001 computes Fourier transforms of its received signal over time, pulses at different frequencies will occur. If these pulses are counted in their frequency bins, what develops is a radar pulse histogram over frequency. The radar pulse histogram can be parameterized 1004 into its various parameters 1006 including frequency 1007, pulse width 1009, modulation 1011 and bandwidth 1013. Since radars are often agile in frequency, lumps will develop around the center frequency of each radar transmitter received. The signal classification task is then to separate out and classify 1008 all the RADAR received. This can more generally be applied to other parameters in addition to frequency. For pulsed signals, pulse width can be measured and can also be used to separate signals. Other parameters are modulation type and rate, pulse repetition rate, etc. The pulse parameters can be classified 1010.

FIG. 10B illustrates classification of unknown digital communication signals, such as, when a QAM receiver receives a signal. An IQ down conversion mixer can parameterize a digital communication signal into in phase sample and a quadrature sample. The multi signal classification 1016 can be performed and a constellation/type classification 1018 can be made.

Figure 11:
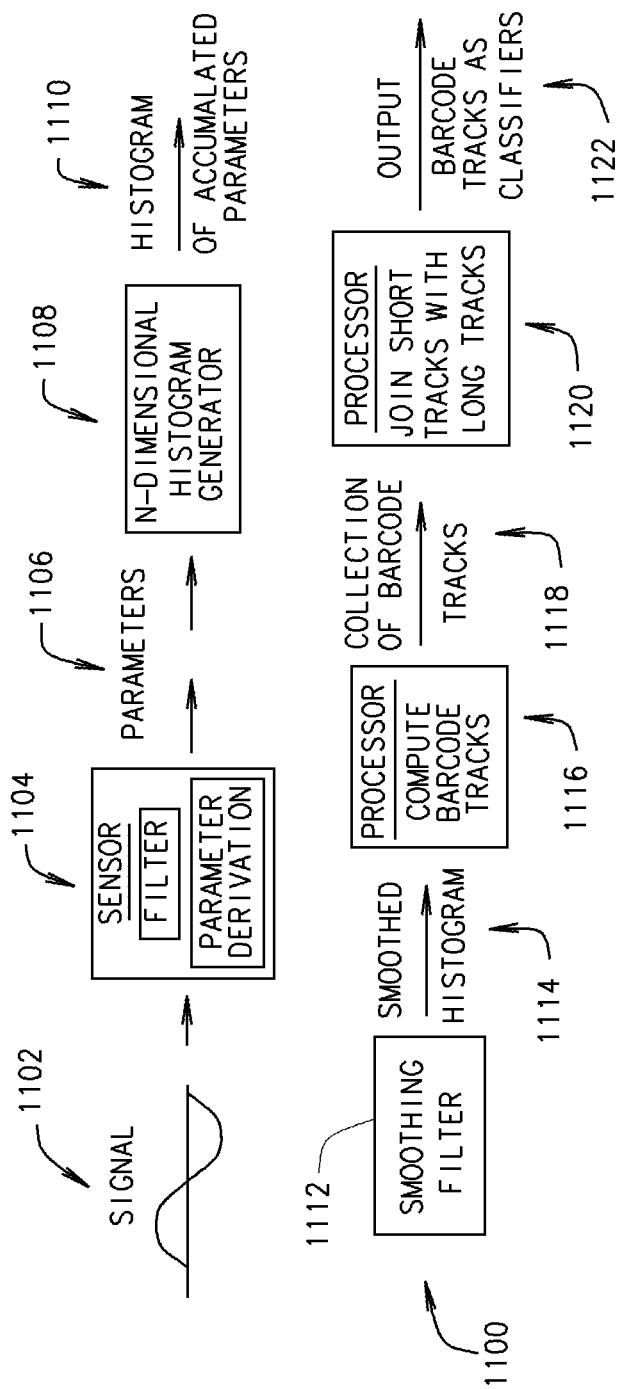

Referring to FIG. 11, an illustration of a signal classification system 1100 is provided. A signal 1102 can be received by the system through a sensor 1104 having a filter and a parameter derivation component. The parameters 1106 output by the sensor can be operated on by a histogram generator 1108 to generate a histogram of accumulated parameters 1110. A smoothing filter 1112 can operate on the histogram of accumulated parameters 1110. The smoothed histogram 1114 can be channeled to a processor 1116 for computing barcode tracks 1118. The processor 1120 can join short tracks with long tracks and output barcode tracks as classifiers 1122.

The various implementations and examples shown above illustrate a method and system for overlapping multi-signal classification. A user of the present method and system may choose any of the above implementations, or an equivalent thereof, depending upon the desired application. In this regard, it is recognized that various forms of the subject signal classification method and system could be utilized without departing from the scope of the present technology and various implementations as disclosed.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present implementation(s). Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. By way of illustration, the histogram generator having a data input adapted to receive one or more of a signal and/or a variable and configured to form an original N dimensional histogram function from one or more of N dimensional signal parameter data for the signal and/or N dimensional variable parameter data for the variable for extracting characteristic parameters of one or more of the variable and/or the signal can be implemented in software, hardware, or combinations thereof. When the functionality of a module is performed in any part through software, the module can include a computer-readable medium. The modules may be regarded as being communicatively coupled. The inventive subject matter may be represented in a variety of different implementations of which there are many possible permutations.

The methods described herein do not have to be executed in the order described, or in any particular order. By way of illustration the process steps of present technology where if the barcode track interval overlaps with any one of the existing barcode track intervals, then the processor performs the process of extending the barcode track interval on one end to include the existing overlapping barcode track interval and, where if the barcode track interval overlaps two or more existing barcode track intervals, then the processor performs the step of creating a new track whose ends encompass all the intersected tracks as well as the barcode track interval under consideration—these steps do not have to be performed in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example implementation, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

The example computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software or program) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media. By way of illustration, a non-transitory computer readable storage medium for use in conjunction with a computer system, where the computer readable storage medium storing one or more programs can include instructions for execution by and specifically configuring the computer system.

The one or more programs when executed by the computer system can cause the computer system to perform operations including generating with a histogram generator program an original N dimensional histogram function from one or more of N dimensional signal parameter data for a signal and N dimensional variable parameter data for a variable for extracting characteristic parameters of one or more of the variable and the signal. The operations can also include filtering the original N dimensional histogram function with a smoothing filter program to filter one or more original N dimensional histogram function bins by treating one or more of histogram bin heights as an N-dimensional signal and thereby creating a smooth shaped curve outline N dimensional histogram function to reduce barcode fracturing. The operations can further include processing and outputting with a barcode track collection program a collection of barcode tracks created by an intersection of the N dimensional histogram function and a topological data analysis function thereby generating the collection of barcode tracks that is tracked down from a higher level of the N dimensional histogram function through a lower level where the collection of barcode tracks disappear whereby there is no further segmented intervals to thereby produce a set of disjointed intervals that represent the possible locations of classes, one for each region bounded by the barcode tracks.

The various implementations shown above illustrate a signal classifier. A user of the present technology as disclosed may choose any of the above implementations, or an equivalent thereof, depending upon the desired application. In this regard, it is recognized that various forms of the subject signal classifier could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A system for classifying a signal comprising:
   a histogram generator having a data input receiving one or more of a signal and a variable and configured to form an original N dimensional histogram function from one or more of N dimensional signal parameter data for the signal and N dimensional variable parameter data for the variable for extracting characteristic parameters of one or more of the variable and the signal;
   a smoothing filter having a histogram input adapted to receive the original N dimensional histogram function and further adapted to filter one or more original N dimensional histogram function bins by treating one or more of histogram bin heights as an N-dimensional signal and thereby implement a smoothing filter to generate an estimation curve outlining the N dimensional histogram function to reduce barcode fracturing; and
   a processor computing and outputting a collection of barcode tracks created by an intersection of the N dimensional histogram function and a topological data analysis function thereby generating the collection of barcode tracks that are segmented horizontal intervals, where said topological data analysis function is tracked down from a higher level of the N dimensional histogram function through a lower level whereby there is no further segmented intervals to thereby produce a set of disjointed intervals creating a collection of barcode tracks that represent possible locations of classes, at least one class for at least one region bounded by the barcode tracks.

2. The system for classifying a signal as recited in claim 1, whereby
   said processor further joining one or more short barcode tracks whose length is below a certain $\Delta_{min}$ value chosen as a function of a signal to noise ratio as applied to each of the signal parameters and that persists for a time period shorter than a certain $\square_t$ value chosen as a function of the signal to noise ratio as applied to at least one of the signal parameters, to a longest barcode track that is next to the short barcode track under consideration to thereby produce a final collection of barcode tracks and further configured to classify the one or more of the signal and the variable received based on the final collection of barcode tracks and output a signal classification.

3. The system for classifying a signal as recited in claim 2, where the processor further selects a barcode level and selects a barcode track interval within said barcode level and if said barcode track interval doesn't overlap any existing barcode track intervals, then create a new barcode track interval.

4. The system for classifying a signal as recited in claim 3, where the processor is further configured such that if the barcode track interval overlaps with any one of the existing barcode track intervals, then the barcode track interval is extended on one end to include the existing overlapping barcode track interval.

5. The system for classifying a signal as recited in claim 4, where the processor is further configured such that if the barcode track interval overlaps two or more existing barcode track intervals, then a new track is created whose ends encompass at least one intersected track as well as the barcode track interval under consideration.

6. The system for classifying a signal as recited in claim 5, where the one or more of N dimensional signal parameter data for the signal and N dimensional variable parameter data for the variable includes multiple radar pulse sources over frequency.

7. The system for classifying a signal as recited in claim 5, where the one or more of N dimensional signal parameter data for the signal and N dimensional variable parameter data for the variable includes an unknown digital communication signal.

8. A method for classifying a signal comprising:
   generating with a histogram generator an original N dimensional histogram function from one or more of N dimensional signal parameter data for a signal and N dimensional variable parameter data for a variable for extracting characteristic parameters of one or more of the variable and the signal;
   filtering the original N dimensional histogram function with a smoothing filter to filter one or more original N dimensional histogram function bins by treating one or more of histogram bin heights as an N-dimensional signal and thereby implement a smoothing filter to generate an estimation curve outlining the N dimensional histogram function to reduce barcode fracturing; and
   computing with a computer processor and outputting a collection of barcode tracks created by an intersection of the N dimensional histogram function and a topological data analysis function thereby generating the collection of barcode tracks that are segmented horizontal intervals, where said topological data analysis function is tracked down from a higher level of the N dimensional histogram function through a lower level whereby there is no further segmented intervals to thereby produce a set of disjointed intervals creating a collection of barcode tracks that represent possible locations of classes, at least one class for at least one region bounded by the barcode tracks.

9. The method for classifying a signal as recited in claim 8, whereby
   said processor further performs computing a function of joining one or more short barcode tracks whose length is below a certain $\Delta_{min}$ value chosen as a function of the signal to noise ratio as applied to at least one of the signal parameters, to a longest barcode track that is next to the short barcode track under consideration thereby producing a final collection of barcode tracks and further classifying the one or more of the signal and the variable received based on the final collection of barcode tracks and outputting a signal classification.

10. The method for classifying a signal as recited in claim 9, where the processor further selects a barcode level and selects a barcode track interval within said barcode level and if said barcode track interval doesn't overlap any existing barcode track intervals, then creating a new barcode track interval.

11. The method for classifying a signal as recited in claim 10, where if the barcode track interval overlaps with any one of the existing barcode track intervals, then the processor extends the barcode track interval on one end to include the existing overlapping barcode track interval.

12. The method for classifying a signal as recited in claim 11, where if the barcode track interval overlaps two or more existing barcode track intervals, then the processor performs the step of creating a new track whose ends encompass at least one intersected track as well as the barcode track interval under consideration.

13. The method for classifying a signal as recited in claim 12, where the one or more of N dimensional signal parameter data for the signal and N dimensional variable parameter data for the variable includes multiple radar pulse sources over frequency.

14. The method for classifying a signal as recited in claim 12, where the one or more of N dimensional signal parameter data for the signal and N dimensional variable parameter data for the variable includes an unknown digital communication signal.

15. A non-transitory computer readable storage medium for use in conjunction with a computer system, the computer readable storage medium storing one or more programs including instructions for execution by and specifically configuring the computer system, the one or more programs when executed by the computer system cause the computer system to perform operations comprising:

generating with a histogram generator program an original N dimensional histogram function from one or more of N dimensional signal parameter data for a signal and N dimensional variable parameter data for a variable for extracting characteristic parameters of one or more of the variable and the signal;

filtering the original N dimensional histogram function with a smoothing filter program to filter one or more original N dimensional histogram function bins by treating one or more of histogram bin heights as an N-dimensional signal and thereby implement a smoothing filter to generate an estimation curve outlining the N dimensional histogram function to reduce barcode fracturing; and processing and outputting with a barcode track collection program a collection of barcode tracks created by an intersection of the N dimensional histogram function and a topological data analysis function thereby generating the collection of barcode tracks that are segmented horizontal intervals, where said topological data analysis function is tracked down from a higher level of the N dimensional histogram function through a lower level whereby there is no further segmented intervals to thereby produce a set of disjointed intervals creating a collection of barcode tracks that represent possible locations of classes, at least one class for at least one region bounded by the barcode tracks.

16. The non-transitory computer readable storage medium as recited in claim 15, where the one or more programs when executed by the computer system cause the computer system to perform operations comprising:

computing a function of joining one or more short barcode tracks whose length is below a certain $\Delta_{min}$ value chosen as a function of signal to noise ratio as applied to at least one of the signal parameters, to a longest barcode track that is next to the short barcode track under consideration thereby producing a final collection of barcode tracks and further classifying the one or more of the signal and the variable received based on the final collection of barcode tracks and outputting a signal classification.

17. The non-transitory computer readable storage medium as recited in claim 16, where the one or more programs when executed by the computer system cause the computer system to perform operations comprising:

selecting a barcode level and selecting a barcode track interval within said barcode level and if said barcode track interval doesn't overlap any existing barcode track intervals, then creating a new barcode track interval.

18. The non-transitory computer readable storage medium as recited in claim 17, where the one or more programs when executed by the computer system cause the computer system to perform operations where if the barcode track interval overlaps with any one of the existing barcode track intervals, then extending the barcode track interval on one end to include the existing overlapping barcode track interval.

19. The non-transitory computer readable storage medium as recited in claim 18, where the one or more programs when executed by the computer system cause the computer system to perform operations where if the barcode track interval overlaps two or more existing barcode track intervals, then creating a new track whose ends encompass at least one intersected track as well as the barcode track interval under consideration.

20. The non-transitory computer readable storage medium as recited in claim 18, where the one or more programs when executed by the computer system cause the computer system to perform operations of inputting the one or more of N dimensional signal parameter data for the signal and N dimensional variable parameter data for the variable including multiple radar pulse sources over frequency.

* * * * *